United States Patent [19]

Van Gasse

[11] 4,137,215

[45] Jan. 30, 1979

[54] PROCESS FOR PREPARING DECORATIVE PLASTICS ARTICLES, AS WELL AS PRODUCTS PREPARED ACCORDING TO THE PROCESS

[75] Inventor: René L. E. Van Gasse, Schoten, Belgium

[73] Assignee: Stamicarbon, B.V., Geleen, Netherlands

[21] Appl. No.: 646,488

[22] Filed: Jan. 5, 1976

Related U.S. Application Data

[63] Continuation of Ser. No. 463,368, Apr. 23, 1974, abandoned.

[30] Foreign Application Priority Data

Apr. 26, 1973 [NL] Netherlands ........................ 7305807

[51] Int. Cl.² ............................................. C08L 67/00
[52] U.S. Cl. ............................ 260/40 R; 260/37 EP; 260/40 P; 260/862; 260/873; 264/73; 264/77; 264/122; 264/236
[58] Field of Search ...................... 264/73, 74, 76, 236, 264/122, 123, 126, 132, 137, 78, 77; 260/40 R, 40 P, 37 EP, 862, 873

[56] References Cited

U.S. PATENT DOCUMENTS

| 2,136,450 | 11/1938 | Marks | 264/73 |
|---|---|---|---|
| 2,920,350 | 1/1960 | Hosch | 264/77 |
| 3,049,761 | 8/1962 | Yakubik | 264/122 |
| 3,082,179 | 3/1963 | Miller et al. | 264/73 |
| 3,095,400 | 6/1963 | Marfino et al. | 260/43 |
| 3,152,002 | 10/1964 | Wisotaky et al. | 264/77 |
| 3,239,474 | 3/1966 | Cwik | 260/2.5 |
| 3,309,444 | 3/1967 | Schuelker | 264/122 |
| 3,310,619 | 3/1967 | Slosberg | 264/77 |
| 3,315,019 | 4/1967 | Fischer | 264/73 |
| 3,381,067 | 4/1968 | Kemmler | 264/77 |
| 3,418,152 | 12/1968 | Staudenmayer et al. | 264/122 |
| 3,470,199 | 9/1969 | Jung | 264/310 |
| 3,517,805 | 6/1970 | Gould | 264/122 |
| 3,584,096 | 6/1971 | Kassban et al. | 264/9 |
| 3,663,493 | 5/1972 | Miller | 264/73 |
| 3,787,280 | 1/1974 | Conger et al. | 264/473 |

*Primary Examiner*—Jay H. Woo
*Attorney, Agent, or Firm*—Cushman, Darby & Cushman

[57] ABSTRACT

Process for imparting a reproducible decorative effect to moulded plastics articles prepared from moulding compositions containing colored components, and to such plastics articles obtained according to the process.

9 Claims, 5 Drawing Figures

PROCESS FOR PREPARING DECORATIVE PLASTICS ARTICLES, AS WELL AS PRODUCTS PREPARED ACCORDING TO THE PROCESS

This is a continuation, of application Ser. No. 463,368 filed Apr. 23, 1974 now abandoned.

This invention relates to a process for imparting a reproducible decorative effect to moulded plastics articles prepared from moulding compositions containing coloured components, and to such plastics articles obtained according to such a process.

Moulding compositions which may be used to obtain moulded plastics articles therefrom may be a premixed granular, pasty or liquid substance. Generally such material includes a fibrous reinforcing material, a filler and a binding agent. The fibrous reinforcing material may consist of a mineral fibrous material, of inert plastics and/or vegetable-fibres. The filler generally is a mineral filler and may be in the form of a powder, crystals and/or lamella. The binding agent may be a curable synthetic resin, which becomes cured at an elevated temperature and/or pressure. An example of such a resin is an unsaturated polyester resin, although other plastics may be used for binding agent, e.g. thermoplasts.

Many moulding materials which may be so used are compression compounds commercially known as bulk moulding compound (SMC), dough moulding compound (DMC), or sheet moulding compound (SMC), sometimes called 'prepreg', e.g. pre-impregnated glass mat known as 'prepegs'. A catalyst is added for rapid curing of such moulding material, together with an internal solvent, e.g. zinc stearate, whereby a single-colour plastics product is obtained by the addition of a pigmenting powder. Hitherto the use of such single-colour compounds has mainly been confined to products for industrial use.

It is known that decorative effects in plastics articles can be obtained by adding a blowing agent to a polyester resin system prior to polymerization, so that crack formation occurs in the moulded article without any concomitant structural defects being produced. A decorative effect of this kind however does result in some disadvantages, particularly in uses where hygiene is important.

It is also known that a heterogenous complex may be obtained using two differently coloured plastic moulding compounds, for instance by calendering, to obtain a decorative effect. However this process merely produces an unconvincing marble-like effect and furthermore renders the material as a whole less susceptible to rapid curing.

Laminates are known which are provided with a photographically obtained decorative interlayer. Such as interlayer is however susceptible to wear or damage by mechanical treatment, and its application to unusually shaped articles may be difficult.

By the process of the invention, a reproducible decorative effect may be imparted to plastics articles prepared from moulding materials containing coloured components which are capable of solution in the binding agent component of the moulding composition, and which avoids such difficulties, which process is capable of wide application in a simple and rapid manner to achieve a wide range of reproducible decorative effects. In particular realistic effects can be obtained simulating the appearance of marble and of many other kinds of natural stone, e.g. granite, gneiss, basalt and quartzite.

The invention thus provides a process for imparting a reproducible effect extending throughout a moulded plastics article of the type obtained by moulding a moulding composition comprising a binding agent and one or more filler materials; wherein the said moulding material contains polymer particles which are of a colour different from the moulding composition when moulded; and wherein the said polymer particles are used in a predetermined amount based on the moulding composition, and the solubility thereof in the said binding agent is controlled by controlling the moulding conditions.

By the use of such coloured polymer components, and by controlling the moulding operation, e.g. by controlling the time at which moulding is effected during or after incorporation of the polymer particles, partial or full solubilization of the polymer particles in the binding agent may be effected to impart a reproducible decorative effect. In particular the reproducible decorative effect obtained according to the invention may be determined by the choice of the kind, shape, quantity and particular colour of the polymer particles, by the space of time (if any) between the incorporation of the polymer particles prior to the moulding, as well as by particular moulding conditions used, i.e. the pressure, temperature and/or the curing time, or during the shaping of a thermoplast already polymerized. By control of such parameters, the extent to which the polymer particles become dissolved in the binding agent may be controlled, and if desired, stopped. The effect and magnitude of the solution of the polymer particles may thus be readily determined by simple experiment.

Further by the use of filler materials which are at least partly coarse-grained, for example particles of quartzite, mica or corundum, or other mineral materials, the reproducible decorative effect may be enhanced, e.g. the outward appearance of natural stone may be achieved. Particles of up to about 3 mm. may thus be used.

In one embodiment of the invention the said moulding composition containing the polymer particles is moulded after a period of time after incorporation of the said polymer particles.

With moulding compositions which contain an unsaturated polyester resin and styrene monomer, the polymer particles may be for instance a a homopolymer or copolymer of styrene or of polyvinyl acetate which are coloured differently from the moulding composition.

With moulding compositions which contain a prepolymer of a polyurethane, e.g. a prepolymer comprising a prepolymer of polyester glycol and a di-isocyanate, the polymer particles may be a linear polyurethane which is coloured differently from the moulding composition. Alternatively the prepolymer used may be a prepolymer of epoxy resin, e.g. a prepolymer of epichlorohydrin and bisphenol. A, using for example coloured polyvinyl alcohol as the polymer particles.

With moulding compositions which contain a prepolymer of a polylactam, for instance an epsilon-caprolactam prepolymer prepared anionically, the polymer particles may be a polyamide which is coloured differently from the moulding composition.

The colour, the shape and the size of the incorporated polymer particles used depend on the desired decorative effect. They may be for example granular, flaky, elongated or thread-shaped. Generally the size of the polymer particles are between 0.1 and 10 mm. Depending on the required effect, a 0.1 % to about 20 % by weight, or more, of polymer particles may be added to the moulding composition. The moulding composition before the addition of the polymer particles may be a single colour composition e.g. coloured grey beige or reddish.

Since the polymer particles become incorporated in the moulding composition so as to be substantially regularly distributed therein, articles of any shape can be made showing a decorative surface, which effect is retained in the event of wear of the surface.

The following Examples of the invention are provided:

EXAMPLE 1

The following mixture was composed in a mixer-kneader:

| unsaturated polyester resin | 650 parts by weight |
| styrene monomer | 250 parts by weight |
| diallyl phthalate | 100 parts by weight |
| feet. butyl perbenzoate | 10 parts by weight |
| water | 5 parts by weight |
| magnesium oxide | 50 parts by weight |
| calcium carbonate | 1,000 parts by weight |
| asbestos fibre | 500 parts by weight |
| glass fibre, 6 mm long | 100 parts by weight |

Two days later, granular polystyrene with a grain size of up to 1 mm was added to this mixture and mixed therewith, viz.:

| dark-brown coloured | 10 grams |
| light-brown coloured | 10 grams |
| yellow-coloured | 5 grams |

After the incorporation, a waiting period of 12 hours elapsed, whereupon the mixture was compressed at a temperature of 130° C, for 100 seconds.

As unsaturated polyester resin a polycondensation product in the starting moulding composition, composition was as follows:
- 1.5 moles of hydrated bisphenol A
- 1.5 moles of propylene glycol
- 0.5 mole of phthalic acid anhydride
- 1 mole of maleic acid anhydride
- 1 mole of fumaric acid anhydride After the compression, the product showed a marble-like effect, as shown in FIG. 1 of the accompanying photographs.

EXAMPLE 2

The following mixture was composed in a mixer-kneader:

| unsaturated polyester resin (as in Example I) | 700 parts by weight |
| styrene monomer | 200 parts by weight |
| diallyl phthalate | 100 parts by weight |
| tert. butyl peroctoate | 10 parts by weight |
| zinc stearate | 20 parts by weight |
| calcium-magnesium carbonate | 2,000 parts by weight |
| glass fibre, 12 mm long | 1,000 parts by weight |

Two hours after the mixing, flaky, and dry pieces of polyvinyl acetate having a thickness of 0.1 to 0.2 mm and varying in size from 1 to 10 mm were added to this mixture in the following quantity:

| black-coloured | 100 grams |
| green-coloured | 50 grams |
| white | 200 grams |

After the incorporation, the whole mixture was compressed at a temperature of 120° C for 120 seconds and worked up in 1 hour's time. The resulting product showed a gneiss-like effect, as shown in FIG. 2 of the accompanying photographs.

EXAMPLE 3

A similar procedure to that set forth in Example 2 was followed, in which the incorporation of the polyvinyl acetate flakes as the last component was effected during the preparation of the 'premix', following which the work was interrupted for 2 hours prior to compression.

In this test a many-coloured, spotty whole was obtained because of the fact that the polyvinyl acetate flakes became dissolved in the styrene monomer to a slightly higher degree than in Example II. The product is shown in FIG. 3 of the accompanying photographs.

EXAMPLE 4

By the same procedure, starting from different quantities and colours of the polymer particles, the results rendered in the FIGS. 4 and 5 were obtained.

Figure 1:
FIG. 1 is a photograph of the product obtained from the process described in Example I.
Figure 2:
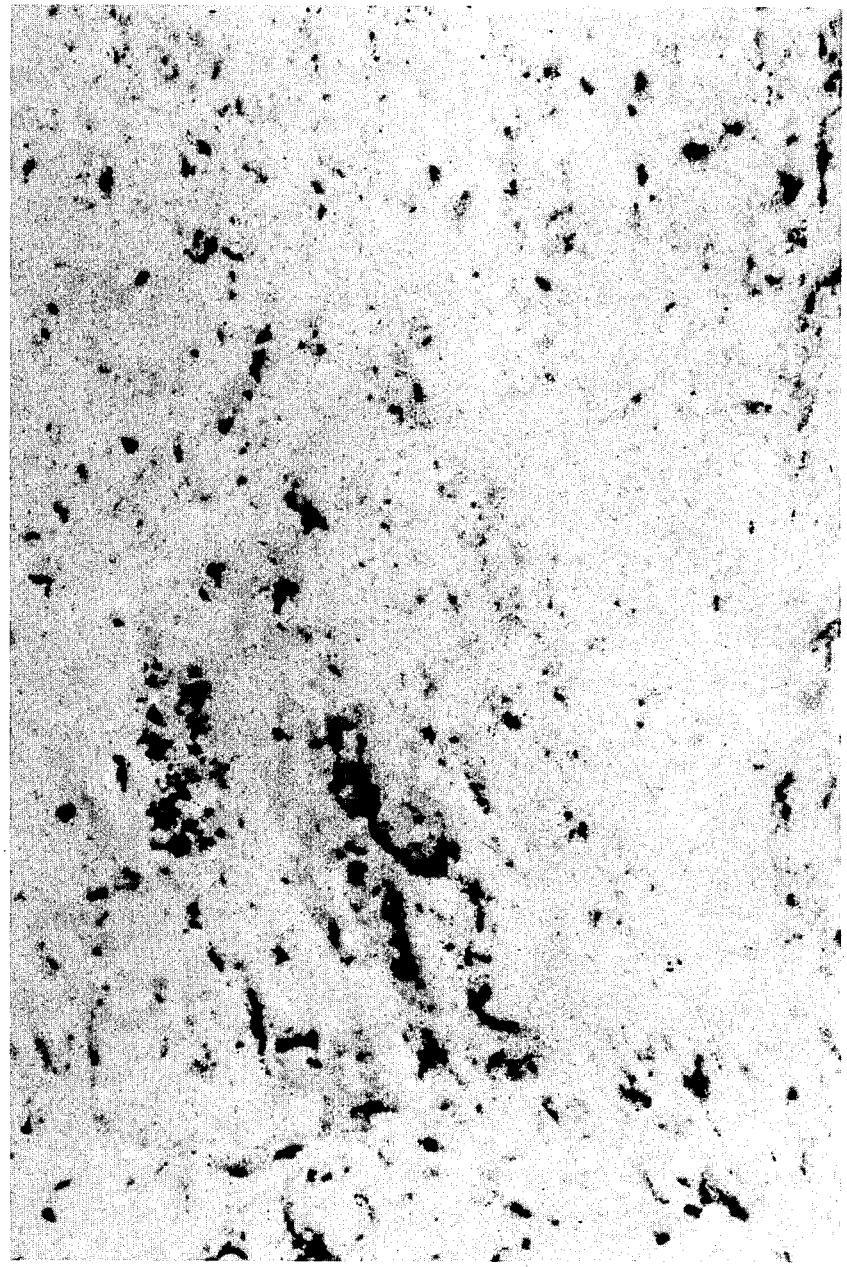
FIG. 2 is a photograph of the product obtained from the process described in Example II.
Figure 3:
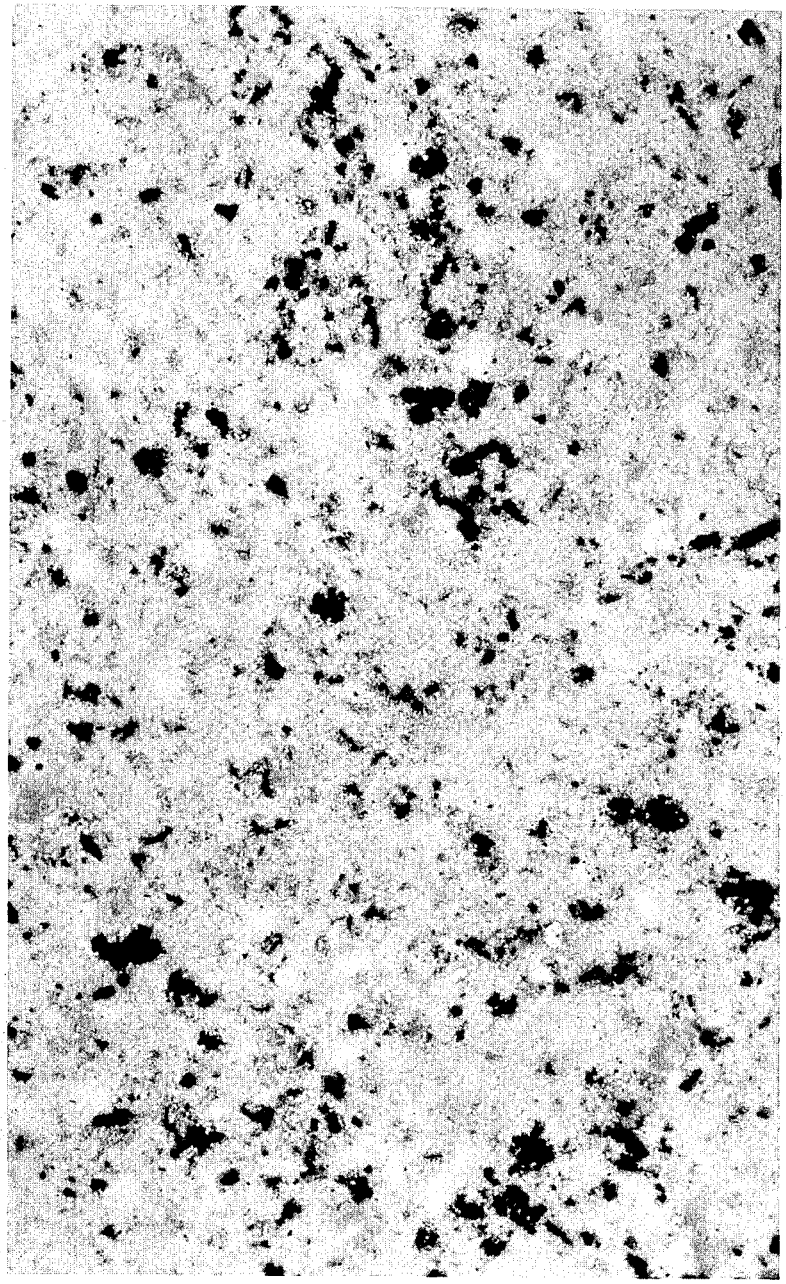
FIG. 3 is a photograph of the product obtained from the process described in Example III.
Figure 4:
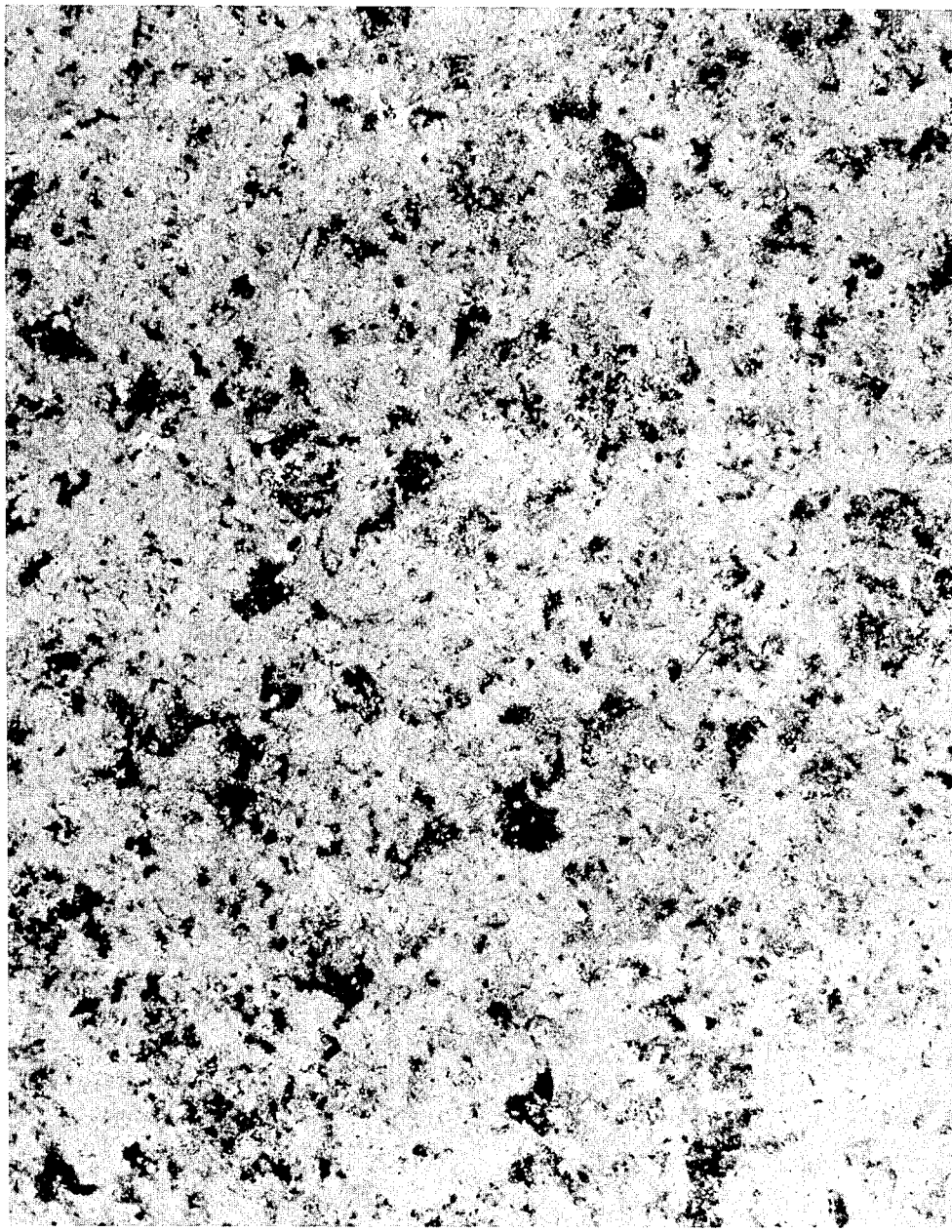
FIGS. 4 and 5 are photographs of the products obtained from the process described in Example IV.
Figure 5:
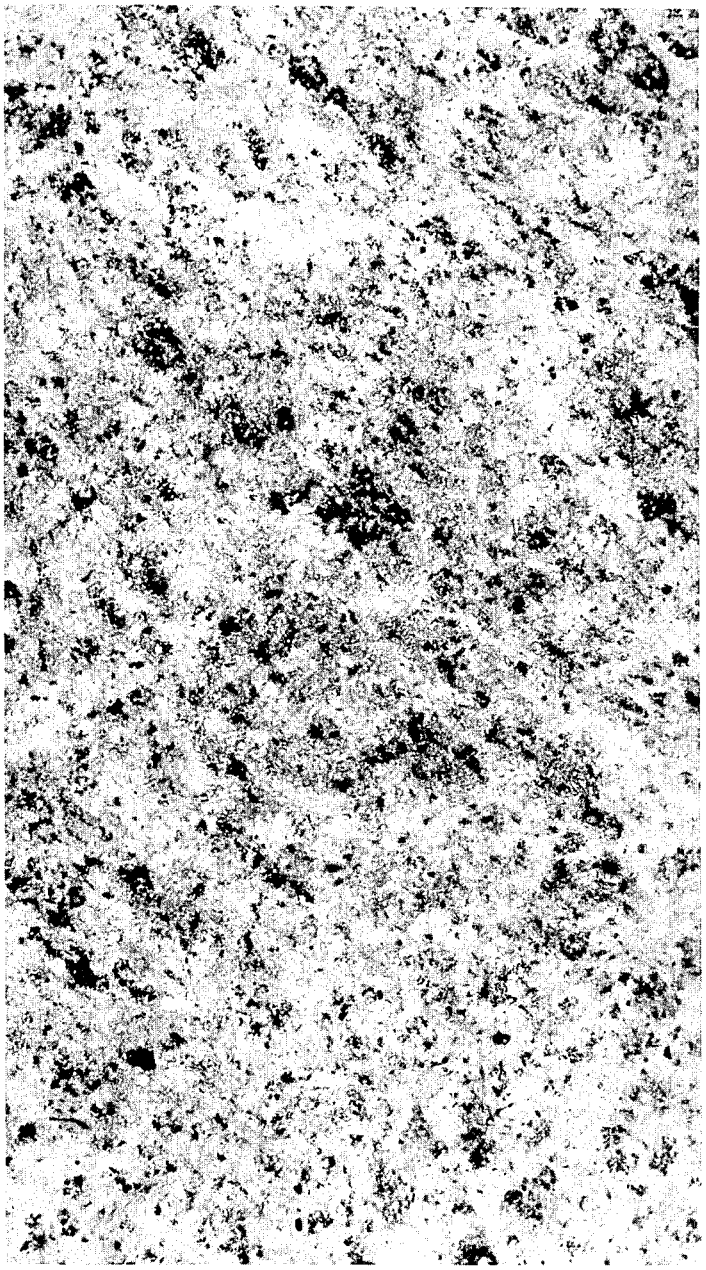

The plastics article with decorative effect, prepared according to the process of the invention, consists according to the description and the examples of a polymer binding agent, incorporating granular, flaky, elongated or thread-shaped, differently coloured polymer particles having dimensions lying between 0.1 and approximately 10 mm, in a quantity of 0.1 to about 20 % by weight relative to the binding agent, which polymer particles are at least in part dissolved in the polymer binding agent.

From the fact that the differently coloured polymer particles are at least in part dissolved in the polymer binding agent follows that the particles consist of a polymer different from the binding agent.

What is claimed is:

1. A process for imparting a reproduceable decorative effect in a molded plastic article, said decorative effect extending throughout said article, which process comprises the steps of:
   (A) forming a molding composition by mixing
      (i) a curable thermosetting binder material, composed of an unsaturated polyester admixed with styrene monomer,
      (ii) at least one inorganic filler selected from calcium carbonate, calcium magnesium, and crystalline minerals,
      (iii) glass fiber, and
      (iv) solid polymer particles in an amount of from 0.1 to 20% by weight, based on said binder, said particles being a homopolymer or copolymer of styrene or of polyvinyl acetate and having dimensions between 0.1 and 10 millimeters, a visible color different from the color of said binder, and being composed of a homopolymer or copolymer, which is at least partially soluble in said binder material at elevated temperatures and pressures and (B) placing said composition in a mold and subjecting the same to elevated temperatures pressures for a period of time predetermined to be sufficient to
   (a) cure said thermosetting binder material, but
   (b) insufficient to effect more than partial solubilization of polymer particles in said binder material, whereby a decorative molded article is obtained in which said solid polymer particles are partially solubilized and dispersed within the now cured thermoset binder material.

2. The process of claim 1, wherein after step (A), said molding composition in held dormant for a period of time prior to subjecting it to the conditions of step (B).

3. The process of claim 1, comprising or reproducing said molded article by repeating steps (A) and (B).

4. A process according to claim 1 wherein the said moulding composition contains a prepolymer of polyurethane and the polymer particles are of a linear polyurethane.

5. A process according to claim 4, wherein the said prepolymer of polyurethane is a prepolymer of a polyester glycol and a di-isocyanate.

6. A process according to claim 4, wherein the said prepolymer is a prepolymer of epichlorohydrin and bisphenol A.

7. A process according to claim 6, wherein the polymer particles incorporated therein are polyvinyl alcohol particles.

8. A process according to claim 1 wherein the said polymer particles are granular, flaky, elongated or thread-shaped particles.

9. Moulded articles obtained by a process according to claim 1.

* * * * *

UNITED STATES PATENT OFFICE
CERTIFICATE OF CORRECTION

Patent No. 4137215  Dated January 30, 1979

Inventor(s) Rene L. E. VAN GASSE

It is certified that error appears in the above-identified patent and that said Letters Patent are hereby corrected as shown below:

At paragraph [73] on the front page format, change Assignee from "Stamicarbon , B.V., Geleen, Netherlands" to -- All Decostone, N.V., Schoten, Belgium --.

*Signed and Sealed this*

*Eleventh* Day of *December 1979*

[SEAL]

*Attest:*

SIDNEY A. DIAMOND

*Attesting Officer*  *Commissioner of Patents and Trademarks*